(12) United States Patent
Graf et al.

(10) Patent No.: US 7,584,293 B1
(45) Date of Patent: Sep. 1, 2009

(54) INFORMATION TRANSMISSION RATE CONTROL ACROSS A CORE NETWORK

(75) Inventors: Leslie Gary Graf, Balwyn (AU); Stephen Christopher Terrill, Stockholm (SE); Christian Norman Groves, Newport (AU); Mark Alan Hollis, Park Orchards (AU); Juan Noguera-Rodriguez, Bromma (SE); Ian Rytina, Carlton (AU)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 614 days.

(21) Appl. No.: 10/069,823

(22) PCT Filed: Sep. 8, 2000

(86) PCT No.: PCT/AU00/01070

§ 371 (c)(1),
(2), (4) Date: May 14, 2002

(87) PCT Pub. No.: WO01/18992

PCT Pub. Date: Mar. 15, 2001

(30) Foreign Application Priority Data

Sep. 9, 1999 (AU) .................................. PQ2741

(51) Int. Cl.
*G06F 15/16* (2006.01)
(52) U.S. Cl. ..................... 709/232; 709/233; 370/235; 370/236
(58) Field of Classification Search ................. 709/241, 709/232; 370/331, 229, 235–236; 455/452.2
See application file for complete search history.

(56) References Cited

U.S. PATENT DOCUMENTS 5,657,322 A    8/1997   Hug ........................... 370/252
6,046,985 A * 4/2000   Aldred et al. ............... 370/252

(Continued)

FOREIGN PATENT DOCUMENTS

CA      2272221      11/1999

(Continued)

OTHER PUBLICATIONS

ITU-T Recommendation I.366.1—Segmentation and Reassembly Service Specific Convergence Sublayer for the AAL type 2—Section 9.0 thru 9.2—dated Jun. 1998.*

(Continued)

*Primary Examiner*—William C. Vaughn, Jr.
*Assistant Examiner*—Greg Bengzon
(74) *Attorney, Agent, or Firm*—Michael Cameron

(57) ABSTRACT

The present invention relates to the information transmission rate between telecommunications nodes. More particularly the invention relates to the control of the rate at which information is transmitted between access nodes separated by a core network. The present invention provides an information rate control function adapted to authorize and/or establish a communication rate for transmission of information including: determining a plurality of maximum information transmission rates along a path of communication established between the plurality of access nodes; selecting a lowest one of the plurality of maximum information transmission rates, and; authorizing and/or establishing communication at a rate no greater than the selected lowest rate. The invention is suitable for use in the transmission of voice information to and from mobile terminals in third-generation mobile access networks across an ATM core network.

20 Claims, 2 Drawing Sheets

U.S. PATENT DOCUMENTS

| | | | | |
|---|---|---|---|---|
| 6,047,328 | A * | 4/2000 | Charny et al. | 709/233 |
| 6,052,371 | A * | 4/2000 | Lemieux | 370/338 |
| 6,097,965 | A * | 8/2000 | Honkasalo et al. | 455/452.2 |
| 6,118,834 | A * | 9/2000 | Rasanen | 375/372 |
| 6,125,106 | A * | 9/2000 | Ostrup et al. | 370/230 |
| 6,134,434 | A * | 10/2000 | Krishnamurthi et al. | 455/419 |
| 6,192,029 | B1 * | 2/2001 | Averbuch et al. | 370/229 |
| 6,192,039 | B1 * | 2/2001 | Nishio et al. | 370/331 |
| 6,205,129 | B1 * | 3/2001 | Esteves et al. | 370/331 |
| 6,359,862 | B1 * | 3/2002 | Jeffries et al. | 370/232 |
| 6,359,863 | B1 * | 3/2002 | Varma et al. | 370/232 |
| 6,519,259 | B1 * | 2/2003 | Baker et al. | 370/395.4 |
| 6,522,655 | B1 * | 2/2003 | Laiho | 370/410 |
| 6,556,573 | B1 * | 4/2003 | Kaaresoja | 370/395.64 |
| 6,574,193 | B1 * | 6/2003 | Kinrot | 370/229 |
| 6,574,224 | B1 * | 6/2003 | Brueckheimer et al. | 370/395.6 |
| 6,657,954 | B1 * | 12/2003 | Bird et al. | 370/229 |
| 6,687,226 | B1 * | 2/2004 | Galyas | 370/231 |
| 6,898,181 | B1 * | 5/2005 | Rasanen | 370/231 |
| 7,006,472 | B1 * | 2/2006 | Immonen et al. | 370/332 |
| 7,054,269 | B1 * | 5/2006 | Luguern et al. | 370/232 |
| 2001/0016489 | A1 * | 8/2001 | Haymes et al. | 455/423 |

FOREIGN PATENT DOCUMENTS

| | | |
|---|---|---|
| EP | 0 812 083 A1 | 12/1997 |
| FR | 2 671 250 | 7/1992 |
| WO | WO 97/39593 | 10/1997 |

OTHER PUBLICATIONS

ITU-T Recommendation I.366.2—AAL type 2 service specific convergence sublayer for narrow-band services.*

ITU-T Recommendation I.363.2-Series 1: Integrated Services Digital Network; Overall Network Aspects and Functions-Protocol Layer Requirements; B-ISDN ATM Adaptation Layer Specification: Type 2 AAL; Sep. 1997.

* cited by examiner

INFORMATION TRANSMISSION RATE CONTROL ACROSS A CORE NETWORK

FIELD OF INVENTION

The present invention relates generally to the information transmission rate between telecommunications nodes. In one aspect, the present invention relates to the control of the rate at which information is transmitted across a core network, and in particular to the control of the rate at which information is transmitted to and from endpoints in access networks separated by a core network. The invention is suitable, in one aspect, for use in the transmission of voice information to and from mobile terminals in third-generation mobile access networks across an ATM core network and it will be convenient to hereinafter describe the invention in relation to that exemplary application. It should be appreciated, however, that the invention is not limited to that application, only.

BACKGROUND OF INVENTION

The evolution of mobile communications systems and broadband multi-service networks are generally expected to merge in third-generation mobile systems that will provide global multimedia access to the mobile user. The concept referred to in Europe as the Universal Mobile Telecommunication System (UMTS) and globally as International Mobile Telecommunications in the year 2000 (IMT-2000) includes high-level access to multimedia services and evolution from second-generation mobile systems as key components. Standardization of this new system is carried out mainly by the $3^{rd}$ Generation Partnership Project (3GPP) and the International Telecommunication Union—Telecommunication Standardization Sector (ITU-T).

UMTS/IMT-2000 separates the access functionality from the core network functionality, providing a common core network to support various types of access networks. Access networks provide core-network-technology-independent access platforms for mobile and other terminals to all core networks and network services. In order to support the convergence of fixed and mobile telecommunications networks, a common core network for both fixed and mobile access is envisaged.

Bandwidth at the air interface in the mobile access networks, which can vary greatly during calls, remains a limiting factor in the volume of information that can be transmitted to and from the wireless mobile terminals

SUMMARY OF INVENTION

It would therefore be desirable to provide means for facilitating convergence of transmission of information between various nodes in access networks separated by a core network.

In one aspect the present invention provides in a telecommunication system having, a core network and a plurality of access nodes in communication with the core network, an information rate control function means adapted to authorise and/or establish a communication rate for transmission of information including:

determining means for determining a plurality of maximum information transmission rates along a path of communication established between the plurality of access nodes;

selecting means for selecting a lowest one of the plurality of maximum information transmission rates, and;

authorising and/or establishing means for authorising and/or establishing communication at a rate no greater than the selected lowest rate.

In another aspect the present invention provides a method of authorising and/or establishing a communication rate for transmission of information in a telecommunication system having a core network and a plurality of access nodes in communication with the core network, including the steps of:

determining a plurality of maximum information transmission rates along a path of communication established between the plurality of access nodes;

selecting a lowest one of the plurality of maximum information transmission rates, and;

authorising and/or establishing communication at a rate no greater than the selected lowest rate.

Unfortunately, the core network transport protocols of prior art systems, do not currently enable the comparison of the current maximum transmission rate supported by two air interfaces so that the transmission rate of information between mobile terminals or other endpoints within separated access networks cannot be optimized.

Therefore, in essence, the present invention stems from the realisation that a common core/backbone network can support fixed and/or mobile access by introducing a functionality that provides a communication rate for transmission based on a selection of the lowest maximum transmission rate in the communication. The maximum rate of transmission of information between wireless mobile terminals, for instance, is the current maximum transmission rate supported by whichever of the two associated air interfaces is the most congested.

Preferably, the communication rate is dynamically authorised and/or established during a communication session.

Preferably, wherein the communication rate is authorised and/or established at, or prior to, set up of a communication session.

Preferably, the information rate control function means is located in the access nodes.

Preferably, the information rate control function means is located in the core network.

Preferably, the information rate control function means operates in a Service Specific Convergence Sublayer of an AAL2 Adaption layer in the core network.

Preferably, the information rate control function means operates in an RTP Transport layer in the core network.

A communication system including the invention may include at least two access nodes communicating with endpoints, wherein the path of communication includes endpoint to endpoint communication.

One or more of the access nodes may be located in a radio access network. The radio access network may be a second or third generation cellular access network. At least one of the access nodes may be a radio network controller in a UMTS access network. One or more endpoints may be located in a Public Land Mobile Network PLMN. At least one of the endpoints may be a wireless MS.

The core network preferably includes a UMSC for mapping messages into an Iu framing protocol for transport in the UMTS access network.

One or more of the access nodes may be located in a fixed access network, such as, for example, a PSTN, ISDN, or a PSTN/ISDN access network.

In one embodiment of the invention, the plurality of maximum information transmission rates are communicated across the core network as messages within I.366.2 Type 3 cells of an ATM AAL2 protocol.

In another embodiment of the invention, the plurality of maximum information transmission rates are communicated across the core network as messages within RTP packets of an IP protocol.

In another aspect the present invention provides a method for controlling the rate of information transmission between first and second endpoints which communicate with each other via access networks separated by a core network, information transmission to and from said first and second endpoints being respectively set by first and second telecommunications nodes, said first and second endpoints communicating with one of said access networks respectively across first and second interfaces, at least one of said interfaces having a variable maximum information transmission rate, the method including the steps of:

(a) said first and second telecommunications nodes respectively signalling to a remote node the maximum information transmission rate able to be supported by said first and second interfaces;

(b) comparing the maximum information transmission rates that can be supported by said first and second air interfaces; and (c) setting the information transmission rate of each endpoint to not exceed that of the lower of the maximum information transmission rates.

Preferably, the remote node signalled by each of said first and second telecommunications nodes is the other of said first and second telecommunications nodes, the comparison of maximum information transmission rates being carried out in each of said first and second telecommunications nodes.

At least one endpoint may include a codec, wherein step (c) includes setting the rate of operation of the codec to the lower of the maximum information transmission rates.

In one embodiment of the invention, the core network may be an ATM core network. The ATM core network may include a Type 2 Adaptation layer. The Type 2 Adaptation layer may include an I.366.2 Service Specific Convergence Sub-Layer. I.366.2 Type 3 cells may be used to carry rate control information messages from each telecommunications node.

In another embodiment of the invention, the core network may be an IP network. The IP core network may include an RTP transport layer. RTP packets may be used to carry rate control information messages to and from each telecommunications node.

At least one of the interfaces may be an air interface. One or more of the access networks may be a radio access network, such as a UMTS access network. At least one of the telecommunications nodes may be a radio network controller forming part of the UMTS network. At least one of the endpoints may be a wireless mobile terminal. The core network may include a UMSC that acts to map rate control information into an Iu framing protocol for transport in the UMTS access network.

One or more interfaces may alternatively be associated with a fixed access network, such as a PSTN/ISDN network. At least one telecommunications node may be, for example, a transcoder forming part of the fixed access network. At least one of the endpoints may be a fixed network terminal.

A further aspect of the present invention provides a telecommunications system including one or more access networks connected to a core network, first and second endpoints which communicate with each other via said access networks across said core network, information transmission to and from said first and second endpoints being respectively set by first and second telecommunications nodes, said first and second endpoints communicating with one of said access networks respectively across first and second interfaces, at least one of said interfaces having a variable maximum information transmission rate, wherein said first and second telecommunications nodes respectively act to signal to a remote node the maximum information transmission rate able to be supported by said first and second interfaces, said remote node acting to compare the maximum information transmission rates that can be supported by said first and second interfaces, and wherein the first and second telecommunications nodes respectively act to set the information transmission rate to and from said first and second endpoints to not exceed that of the lower of the maximum information transmission rates.

Yet another aspect of the present invention provides a first telecommunications node for use in a telecommunications system including a core network, one or more access networks connected to said core network, and a second endpoint, said first and second endpoints communicating with each other via said access networks across said core network, information transmission to and from said first and second endpoints being respectively set by first and second telecommunications nodes, said first and second endpoints communicating with one of said access networks respectively across first and second interfaces, at least one of said interfaces having a variable maximum information transmission rate, wherein said first telecommunications node acts to signal to a remote node the maximum information transmission rate able to be supported by said first interface, said remote node acting to compare the maximum information transmission rates that can be supported by said first and second air interfaces, and wherein the second telecommunications node acts to set the information transmission rate of said second endpoint to not exceed that of the lower of the maximum information transmission rates.

BRIEF DESCRIPTION OF DRAWINGS

The following description refers in more detail to the various features of the present invention. To facilitate an understanding of the invention, reference is made in the description to the accompanying drawings where the invention is illustrated in a preferred embodiment. It is to be understood, however, that the invention is not limited to the preferred embodiment as illustrated in the drawings.

In the drawings.

DESCRIPTION OF PREFERRED EMBODIMENTS

Figure 1:
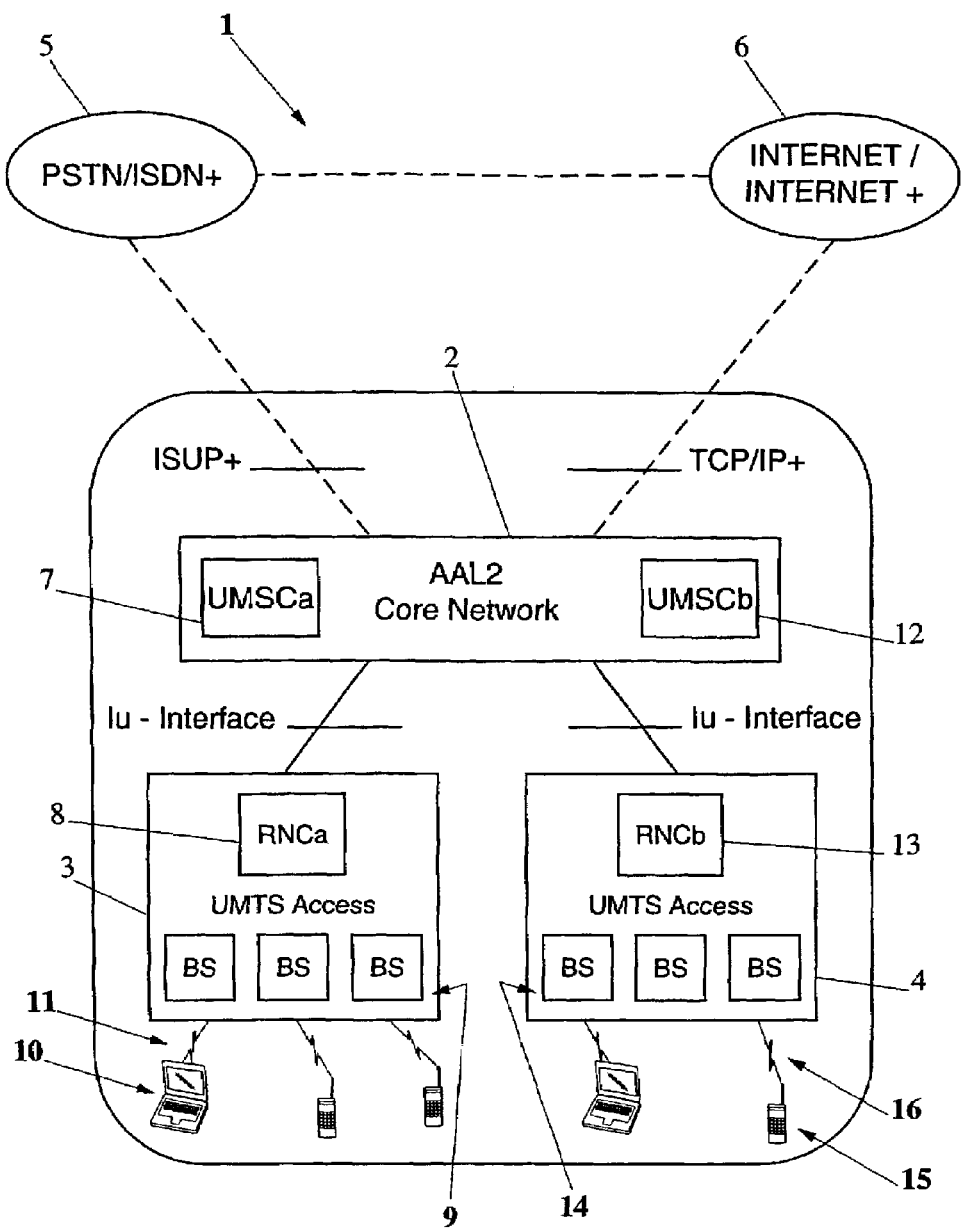
FIG. 1 is a schematic diagram illustrating a cellular system including an ATM core network interconnecting fixed and mobile access networks.

Referring to FIG. 1, there is shown generally a schematic representation of a third-generation cellular system 1 including an ATM core network 2 which has two parallel UMTS radio access networks 3 and 4 linked to it. Additionally, two fixed networks are linked to the ATM core network 2, namely a PTSN/ISDN+ network 5 and an internet/intranet+ network 6. The core network 2 acts to transport information between telecommunications nodes or endpoints forming part of or in communication with any of the networks 3 to 6.

The ATM core network 2 includes at least a first Universal Mobile Telecommunications System Mobile Switching Center (UMSCa) 7 connected to the UMTS radio access network 3 across an Iu-interface. The UMTS radio access network 3 includes at least a first Radio Network Controller (RNCa) 8 and Base Stations (BS) 9 connected to them. Mobile Terminals 10 communicate with the Base Stations 9 across an air interface 11. Similarly, the ATM core network 2 also includes at least a second Universal Mobile Telecommunications System Mobile Switching Center (UMSCb) 12 connected to the UMTS radio access network 4 across an Iu-interface. The UMTS radio access network 4 includes at least a first Radio Network Controller (RNCb) 13 and Base Stations (BS) 14 connected to them. Mobile Terminals 15 communicate with the Base Stations 14 across an air interface 16.

The Base Stations 9 and 14 contain equipment for transmission and reception of information to and from the Mobile Terminals 10 and 15, as well as equipment for encryption/decryption, signal strength measurement and for communication with the Radio Network Controllers 8 and 13. The Radio Network Controllers 8 and 13 set up radio channels for voice and other traffic and for signaling to the UMSCs 7 and 12, and monitor the access network portion of connections established. Notably, the Radio Network Controllers 8 and 13 respectively control the air interface resources, and monitor the availability of those resources, for calls made using the Mobile Terminals 10 and 15. The UMSCs 7 and 12 serve as an interface to the ATM core network 2 and beyond to other access networks, and control the operation of the Radio Network Controllers 8 and 13. Each of the Mobile Terminals 10,15 includes a Coder-Decoder (Codec) for converting analog sound, speech or video to and from digital information suitable for transport across a first of the access networks 3 to 6, the ATM core network 2 and finally a second of the access networks 3 to 6.

The digital information is transported to and from one of the Mobile Terminals 10 to one of the Mobile Terminals 15 across the ATM core network 2. In this example, the ATM core network 2 uses the ATM Adaptation Layer Type 2 (AAL2) transmission protocol. The AAL2 transmission protocol provides for bandwidth-efficient transmission of low-rate, short and variable length cells in delay sensitive applications, and is divided into a Common Part Sub-Layer (CPS) and a Service Specific Convergence Sub-Layer (SSCS). The purpose of the SSCS is to convey narrow-band calls consisting of voice, voiceband data, or circuit mode data. Different SSCSs have been defined to support specific AAL2 user services, or groups of services. One such SSCS is defined in the ITU-T Recommendation I.366.2, otherwise known as I.trunk.

The desired encoding-decoding rate of information content can vary dramatically during a call. For example, upon detection of voiceband data traffic, it may be desirable to increase the rate of operation of the Codecs from a nominal to a higher rate in order to accommodate the voiceband data. If facsimile traffic is detected and facsimile encoding and decoding is supported by the Mobile Terminals 10,15, the rate of operation of the Codecs may be further altered. Similarly, some voice or other information encoding algorithms are adaptive by nature and can use different information transmission rates depending upon the availability of network resources. It is therefore important to be able to adapt the information transmission rate to an optimal setting depending upon the Codec used and the information content transmitted between Mobile Terminals.

Figure 2:
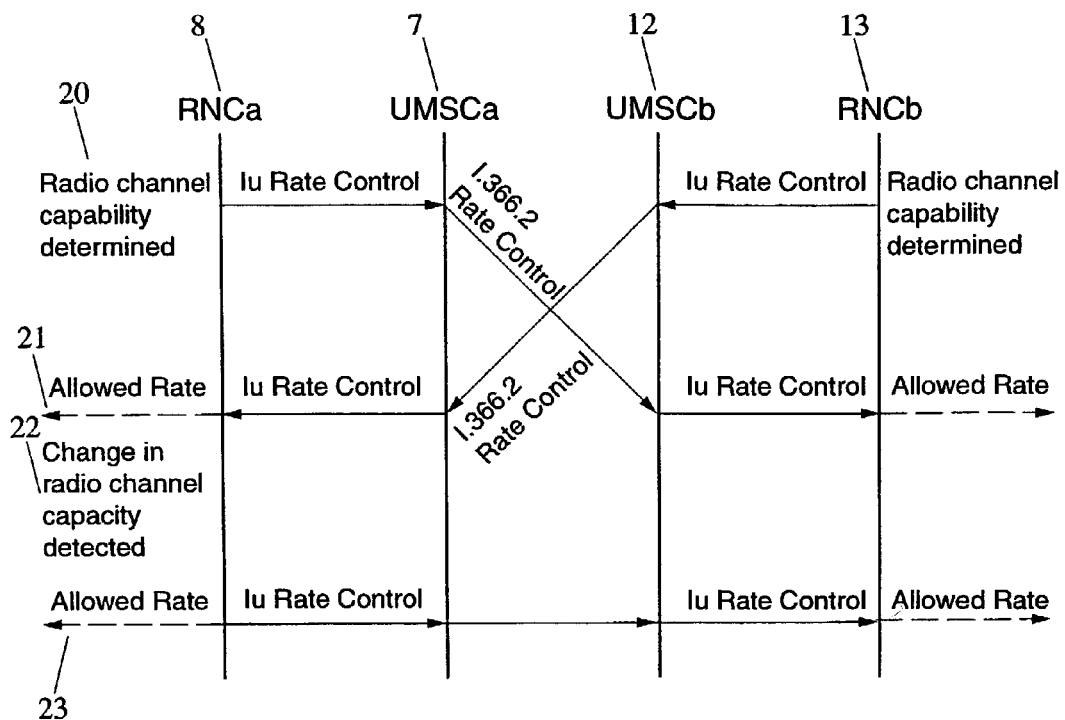
FIG. 2 is a timing diagram showing the exchange of rate control information between mobile terminals communicating with the mobile access networks of FIG. 1.

In accordance with the invention, the maximum information transmission rate is determined by the most congested link in the connections between one of the Mobile Terminals 10 and one of the Mobile Terminals 15, namely the air interfaces 11 and 16. During call set-up, each of the Radio Network Controllers 8 and 13 determines the maximum information transmission rate that the Codec of the remote Mobile Terminal must not exceed. As seen in FIG. 2, a rate control message containing this maximum information transmission rate is sent, at step 20, from each Radio Network Controller 8,13 to its corresponding UMSC 7,12.

Figure 3:
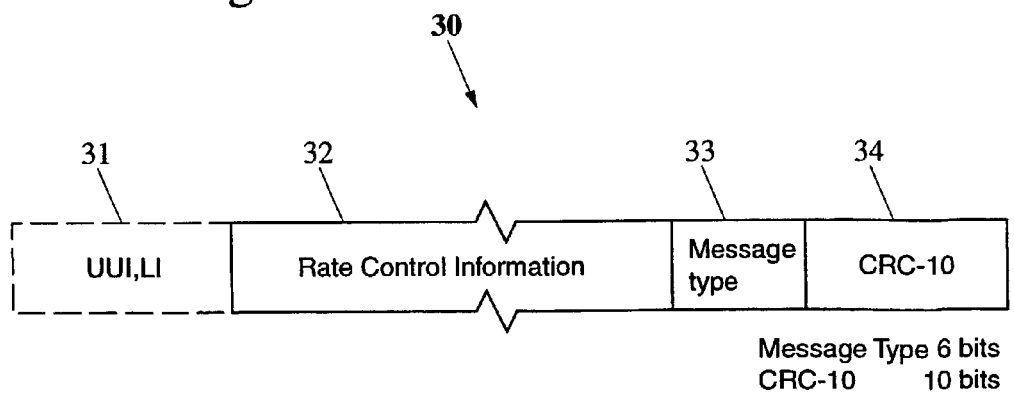
FIG. 3 is a schematic diagram showing the structure of a CPS-Cell used to transport rate control information messages between UMSC's over the AAL2 core network of FIG. 1.

For UMTS, the $3^{rd}$ Generation Partnership Project is currently developing the Iu-interface between RNCs and UMSCs. This framing protocol includes a rate control mechanism. The maximum information transmission rate contained in the rate control mechanism sent across the Iu-interface is received at each UMSC 7 and 12—sent respectively from the RNCs 8 and 13—and mapped into an I.366.2 cell. By way of example, an I.366.2 Type 3 cell 30 is shown in FIG. 3. The I.366.2 Type 3 cell 30 includes a cell header 31, a payload 32, a message type field 33 and a cyclic redundancy check (CRC) field 34. The I.366.2 SSCS makes explicit use of the User-to-User Indication (UUI) and implicit use of the Length Indicator (LI) contained in the cell header 31 to route the cell 30 across the ATM core network 2 between UMSCa 7 and UMSCb 12. The maximum information transmission rate contained in the rate control mechanism sent across the Iu-interface is mapped into the payload 32, and a Rate Control Function code is created in the message type field 33. The entire payload is protected by the 10-bit CRC.

At step 21, when the UMSCb 12 receives a cell 30 sent from the UMSCa 7, the UMSCb 12 detects the presence of a Rate Control Function code in the message type field 33 and then maps the payload of the cell 30 into the rate control message of the Iu framing protocol for transport across the Iu-interface to the Radio Network Controller 13. Similarly, when the UMSCa 7 receives a cell 30 sent from the UMSCb 12, the UMSCa 7 detects the presence of a Rate Control Function code in the message type field 33 and then maps the payload of the cell 30 into the rate control message of the Iu framing protocol for transport across the Iu-interface to the Radio Network Controller 8.

Each Radio Network Controller then uses this rate control message received from the remote Radio Network Controller to control the operation of the Codec of its associated Mobile Terminal by comparing the maximum information transmission rate that can be supported by the air interfaces 11 and 16, and then controlling the rate of operation of that Codec to not exceed the lower of the two maximum information transmission rates.

If a change in the radio channel capacity across one of the air interfaces 11, 16 is detected during the connection, the maximum information transmission rate of both Mobile Terminals may be altered. For example, if an altered radio channel capacity is detected across the air interface 11, in step 22, the Radio Network Controller 8 is able to compare the previously received maximum information transmission rate across the air interface 16 from the remote Radio Network Controller with the newly detected received maximum information transmission rate of the air interface 11, and adjust the rate of operation to the Codec of its associated Mobile Terminal to not exceed the lower of the two maximum information transmission rates.

At the same time, at step 23, the newly detected maximum information transmission rate across the air interface 11 is included in the rate control mechanism of the Iu framing protocol and sent from the RNCa 8 across the Iu-interface to the UMSCa 7. This rate is then mapped into an I.366.2 Type 3 cell 30 and sent from the UMSCa 7 to the UMSCb 12. Upon detection at the UMSCb 12 of the presence of a Rate Control Function code in the message type field 33, the payload of the cell 30 is mapped into the rate control message of the Iu framing protocol for transport across the Iu-interface to the RNCb. That Radio Network Controller then uses this rate control message to compare the maximum information transmission rate that can now be supported by the air interfaces 11 and 16, and controls the rate of operation of the Codec of its associated Mobile Terminal to not exceed the lower of the two maximum information transmission rates.

It should be understood that various modifications and/or additions may be made to the aforementioned method and system for controlling information transmission rate without departing from the ambit of the present invention.

In that regard, the cellular system shown in FIG. 1 may include elements of second and/or third generation cellular systems, such as a GSM, D-AMPS, IS-136 or other radio access networks. Moreover, whilst a Type 2 Adaptation Layer is used in the exemplary ATM core network 2 described above, it is envisaged that other types of ATM adaptation layers may be used with the invention.

Other types of core networks may also be used in relation to the invention. For example, the core network 2 may instead be an Internet Protocol (IP) core network (i.e. a network having an IP network-layer protocol). The transport layer of the IP network may conform to the Real Time Transport-Layer Protocol (RTP). RTP is a framing protocol developed for transporting real-time data across IP networks and designed to be independent of the underlying transport and network layers.

Rate Control Messages sent from the RNCs 8,13 to the UMSCs 7,12 may be mapped into an RTP or RTP Control Protocol (RTCP) packet. An RTP packet includes a fixed RTP header and the payload. The RTP header includes a payload type (PT) field. The maximum information transmission rate contained in the rate control mechanism of the access networks of FIG. 1 may be mapped into the RTP packet payload, and a Rate Control Function code created in the PT field of the RTP header, for transport across an IP core network.

Moreover, access networks communicating with endpoints other than the Mobile Terminals 10,15, and including telecommunications nodes other than RNCs 8,13, may be envisaged. For example, at least one telecommunications node may be a transcoder at the boundary between the core network 2 and the PSTN/ISDN access network 5.

The skilled addressee will appreciate that various other types and combinations of access networks and core networks, and mechanisms for transporting rate control messages across such core networks, may be used in the context of the invention.

The invention claimed is:

1. A computer program embodied on a computer readable medium for controlling a communication rate for the transmission of information between a first mobile terminal and a second mobile terminal via a core network in a wireless telecommunication system, each mobile terminal accessing the wireless telecommunication system via a respective access node, comprising:

a first code segment in a first access node for determining a first maximum information transmission rate along a first air interface between the first access node and the first mobile terminal, wherein the first maximum information rate is dependent upon a Coder-Decoder used by the first mobile terminal and information transmitted between first mobile terminal and the first access node;

a second code segment in a second access node in communication across the core network with the first code segment in the first access node for determining a second maximum information transmission rate along a second air interface between the second access node and the second mobile terminal, wherein the access nodes are adapted to monitor and control air interface resources and wherein the second maximum information rate is dependent upon a Coder-Decoder used by the second mobile terminal and information transmitted between the second mobile terminal and the second access node;

third code segments in the first access node and second access node for cooperatively selecting a lowest one of the determined first and second maximum information transmission rates; and fourth code segments in the first access node and second access node for cooperatively authorizing or establishing a communication rate no greater than the selected lowest rate.

2. The computer program of claim 1, adapted to communicate the plurality of maximum information transmission rates across a core network as messages within I.366.2 Type 3 cells of an ATM AAL2 protocol.

3. The computer program of claim 1, adapted to communicate the plurality of maximum information transmission rates across a core network as messages within RTP packets of an IP protocol.

4. A wireless telecommunications system, comprising:

at least one access network connected to a core network;

a first mobile terminal and a second mobile terminal in communication with each other across the core network via the at least one access network;

a first telecommunication node and a second telecommunication node adapted to set information transmission rates to and from the first and second mobile terminals; and a first air interface and a second air interface comprising, respectively, the first and second telecommunication nodes, wherein the first and second interfaces are adapted to control air interface resources and monitor the availability of the resources; the at least first and second mobile terminals communicating with the at least one access network across the first and second air interfaces;

wherein the first and second telecommunications nodes respectively are each adapted to signal to a remote node the maximum information transmission rate supportable by the first and the second air interfaces, the remote node adapted to compare the maximum information transmission rates that can be supported by the first and second interfaces, wherein each maximum information transmission rate is dependent upon a Coder-Decoder used by each mobile terminal and information transmitted between each mobile terminal and each telecommunications node.

5. A method for use in a telecommunications system having a core network and a plurality of access nodes, said method for controlling a communication rate for transmission of information between mobile terminals in said wireless telecommunication system, comprising the steps of:

determining, by one of the plurality of access nodes, a maximum information transmission rate along each air interface established between the one of the plurality of access nodes, and a respective mobile terminal, wherein each maximum information transmission rate is dependent upon a Coder-Decoder used by the respective mobile terminal and information transmitted between the respective mobile terminal and the one of the plurality of access nodes;

selecting, by one of the plurality of access nodes and another of the plurality of access nodes, the lowest one of the plurality of maximum information transmission rates, and authorizing, by one of the plurality of access nodes and another of the plurality of access nodes, a communication rate no greater than the selected lowest rate.

6. The method of claim 5, wherein the communication rate is dynamically authorized during a communication session including an access node and a respective mobile terminal.

7. The method of claim 6, wherein the communication rate is authorized at the set up of the communication session.

8. The method of claim 6, wherein the communication rate is authorized prior to the set up of the communication session.

9. The method of claim 5, further including the step of communicating the plurality of maximum information transmission rates across the core network as messages within I.366.2 Type 3 cells of an ATM AAL2 protocol.

10. The method of claim 5, further including the step of communicating the plurality of maximum information transmission rates across the core network as messages within RTP packets of an IP protocol.

11. A method for controlling the rate of information transmission between first and second endpoints that communicate with each other via access networks separated by a core network, information transmission rates between the first and second endpoints and a respective air interface with an access network being respectively set by first and second telecommunication nodes, wherein the first and second telecommunication nodes are adapted to maximum information transmission rate respectively across the first and the second air interfaces, the method including the steps of:

signaling by the first and second telecommunications nodes respectively to a remote node the maximum information transmission rate supportable by the first and the second air interfaces;

comparing the maximum information transmission rates supportable by the first and second air interfaces; and setting the information transmission rate of each endpoint to a rate not exceeding that of the lower of the maximum information air interface transmission rates, wherein each maximum information transmission rates is dependent upon a Coder-Decoder used by each endpoint and information transmitted between each endpoint and by the first and second telecommunications nodes respectively.

12. The method of claim 11, wherein the remote node signaled by each of the first and second telecommunications nodes is the other of the first and second telecommunications nodes.

13. The method of claim 11, wherein the comparing of the maximum information transmission rates supportable by the first and second air interfaces is performed in each of the first and second telecommunications nodes.

14. The method of claim 11, wherein the setting of the information transmission rate of each endpoint to not exceed that of the lower of the maximum information transmission rates further comprises setting the rate of operation of a codec to the lower of the maximum information transmission rates.

15. A method for controlling the transmission rate for a communication session between at least two endpoints via respective air interfaces to access networks in communication with a core network, the method comprising the steps of:

signaling by a first telecommunication node operable to monitor a first air interface, the first telecommunication node signaling to communicate a first maximum air interface transmission rate to a remote node, the first maximum air interface transmission rate being the current maximum supportable rate for communication by a first endpoint with its respective access network via the first air interface;

comparing a second maximum air interface transmission rate with the first maximum air interface transmission rate, the second maximum air interface transmission rate being the current maximum supportable rate for communication by a second endpoint with its respective access network via a second air interface; and setting the communication session transmission rate at a rate not greater than the lowest of the first maximum air interface transmission rate and the second maximum air interface transmission rate, wherein each maximum information transmission rates is dependent upon a Coder-Decoder used by each endpoint and information transmitted between each endpoint and by the first and second telecommunications nodes respectively.

16. The method of claim 15, further comprising signaling by a second telecommunication node operable to monitor the second air interface, the second telecommunication node signaling to communicate the second maximum air interface transmission rate to the remote node, wherein the comparing step is performed in the remote node, and wherein the remote node is not the second telecommunication node.

17. The method of claim 15, wherein the remote node is a second telecommunication node, and wherein the comparing step is performed in the second telecommunication node.

18. The method of claim 15, further comprising signaling by a second telecommunication node operable to monitor the second air interface, the second telecommunication node signaling to communicate the second maximum air interface transmission rate to a second remote node.

19. The method of claim 18, wherein the remote node is the second telecommunication node and wherein the second remote node is the first telecommunication node.

20. The method of claim 19, wherein setting the communication session transmission rate comprises signaling by the first telecommunication node and the second telecommunication node to, respectively, a first endpoint and a second endpoint to control their respective encoding rates.

* * * * *

UNITED STATES PATENT AND TRADEMARK OFFICE
CERTIFICATE OF CORRECTION

PATENT NO. : 7,584,293 B1  Page 1 of 1
APPLICATION NO. : 10/069823
DATED : September 1, 2009
INVENTOR(S) : Graf et al.

It is certified that error appears in the above-identified patent and that said Letters Patent is hereby corrected as shown below:

Drawing

In Fig. 1, Sheet 1 of 2, for Tag "6", Line 2, delete "INTERNET +" and insert -- INTRANET + --, therefor.

In Column 1, Line 47, delete "terminals" and insert -- terminals. --, therefor.

In Column 4, Line 61, delete "PTSN/ISDN+" and insert -- PSTN/ISDN+ --, therefor.

Signed and Sealed this

Twenty-first Day of December, 2010

David J. Kappos
*Director of the United States Patent and Trademark Office*